(12) United States Patent

Alhussien et al.

(10) Patent No.: US 9,317,361 B2
(45) Date of Patent: Apr. 19, 2016

(54) BIT-LINE DEFECT DETECTION USING UNSATISFIED PARITY CODE CHECKS

(71) Applicant: Seagate Technology LLC, Cupertino, CA (US)

(72) Inventors: AbdelHakim S. Alhussien, San Jose, CA (US); Erich F. Haratsch, Bethlehem, PA (US); Earl T. Cohen, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 153 days.

(21) Appl. No.: 14/100,280

(22) Filed: Dec. 9, 2013

(65) Prior Publication Data

US 2015/0149855 A1  May 28, 2015

Related U.S. Application Data

(60) Provisional application No. 61/909,540, filed on Nov. 27, 2013.

(51) Int. Cl.
*H03M 13/00* (2006.01)
*G06F 11/10* (2006.01)

(52) U.S. Cl.
CPC .................................. *G06F 11/1012* (2013.01)

(58) Field of Classification Search
CPC .......... H03M 13/116; H03M 13/6511; H03M 13/353; H03M 13/1171; H03M 13/1111; H03M 13/1128; H03M 13/1108; G06F 11/10; G06F 11/1068

USPC .......................... 714/755, 758, 785–786, 807
See application file for complete search history.

(56) References Cited

U.S. PATENT DOCUMENTS

| | | | |
|---|---|---|---|
| 4,584,681 A | 4/1986 | Singh et al. ..................... 371/10 |
| 6,407,953 B1 | 6/2002 | Cleeves ....................... 365/201 |
| 7,346,829 B2 | 3/2008 | Riho et al. .................... 714/758 |
| 8,145,981 B2 | 3/2012 | Mokhlesi et al. ............. 714/780 |
| 2008/0126908 A1* | 5/2008 | Lin ............................... 714/758 |
| 2009/0282319 A1* | 11/2009 | No et al. ....................... 714/780 |
| 2011/0060973 A1 | 3/2011 | Yang et al. .................... 714/799 |
| 2011/0246862 A1* | 10/2011 | Graef ............................ 714/785 |
| 2011/0264986 A1 | 10/2011 | Chin et al. .................... 714/763 |
| 2013/0028021 A1 | 1/2013 | Sharon et al. ............. 365/185.17 |
| 2013/0254622 A1 | 9/2013 | Kanno ........................... 714/755 |
| 2014/0040700 A1 | 2/2014 | Kobori et al. ................. 714/763 |
| 2014/0229792 A1 | 8/2014 | Varnica et al. ................ 714/759 |
| 2015/0128006 A1* | 5/2015 | Alhussien et al. ............ 714/758 |

\* cited by examiner

*Primary Examiner* — Guy Lamarre
(74) *Attorney, Agent, or Firm* — Christopher P. Maiorana, PC

(57) ABSTRACT

An apparatus having a device and a circuit is disclosed. The device has a plurality of bit-lines and is configured to store a codeword. The circuit is configured to (i) receive the codeword from the device, (ii) generate a syndrome by performing a portion less than all of an iterative decoding procedure on the codeword and (iii) generate a map of defects according to the syndrome. Each of a plurality of bits in the map corresponds to a respective one of the bit-lines.

20 Claims, 7 Drawing Sheets

BIT-LINE DEFECT DETECTION USING UNSATISFIED PARITY CODE CHECKS

This application relates to U.S. Provisional Application No. 61/909,540, filed Nov. 27, 2013, which is hereby incorporated by reference in its entirety.

FIELD OF THE INVENTION

The invention relates to fault detection generally and, more particularly, to a method and/or apparatus for implementing a bit-line defect detection using unsatisfied parity code checks.

BACKGROUND

In NAND flash memories, bit-line defects cause entire columns of bits in a block or die to be stuck at a certain state. The defects can occur at manufacture time and can grow in number due to program/erase cycles over a life of the memory. Hence, detecting such defects over the lifetime of the flash memory is difficult if access to written data is limited. Dedicated known a priori data can be used to find error locations, but writing the dedicated data to detect the bit-line defects is a waste of write/read cycles, degrades the flash media further, and may interrupt drive operation.

During scheduled read scrubs of blocks, decoding of read data may fail. Therefore, the unsuccessful decoding will also fail to provide the dedicated data that can be used to detect the errors caused by the bit-line defects through such an approach. Furthermore, the bit-line defects can grow to a number that causes the decoding to fail in a time window outside the scheduled read scrubs of the data. Firmware/software used in the decoding may also become inoperable and so the source of the block failure should be investigated. The decoding can also fail to converge for various reasons, such as system failures, degraded storage media and/or corrupt data.

SUMMARY

The invention concerns an apparatus having a device and a circuit. The device has a plurality of bit-lines and is configured to store a codeword. The circuit is configured to (i) receive the codeword from the device, (ii) generate a syndrome by performing a portion less than all of an iterative decoding procedure on the codeword and (iii) generate a map of defects according to the syndrome. Each of a plurality of bits in the map corresponds to a respective one of the bit-lines.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
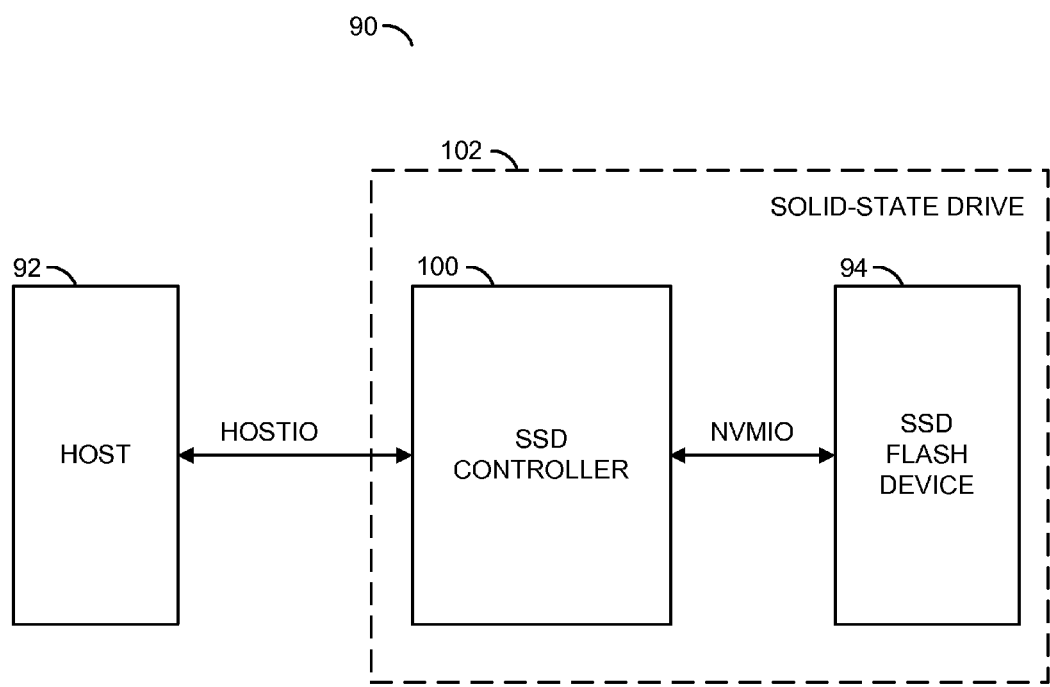
FIG. 1 is a block diagram of an apparatus.

Embodiments of the invention include providing bit-line defect detection using unsatisfied parity code checks that may (i) find the defects based on uncorrected and/or uncorrectable read data, (ii) find the defects without the decoding process converging, (iii) find the defects independent of dedicated data, (iv) determine a code rate of the data, (v) provide a granularity of at most Q unsatisfied parity checks per wrong bit for a column weight Q low density parity check at that bit location, (vi) map defect locations using a bitmap of unsatisfied checks after a portion less than all of an iterative decoding procedure, (vii) provide higher accuracy and less false identification by reading more pages, (viii) operate in different bit error rate regions by changing a threshold used to process/generate the bitmap of unsatisfied checks, (ix) blindly detect in which bit error rate region the memory is operating and which code rate the block was written in adaptive rate systems, (x) use the history of cell state information on-the-fly to speed up convergence and/or (xi) be implemented as one or more integrated circuits.

In low density parity check (e.g., LDPC) code protected storage systems, decoders can have hardware assist circuitry that produces a map of the number of unsatisfied checks at each bit location, or in other embodiments, a map of binary flags to indicate which bits are connected to a certain number of unsatisfied parity checks. The map is generally called a bitmap. Each bitmap has a same size as the corresponding codeword. Information in the bitmap is used to detect bit-line defects after several page reads without the need to correct channel errors and/or have the read data fully decoded. Such bit-line defects are generally repeatable both spatially and temporally, but may only fail in a single direction. For example, the bit-line defect may be a stuck-at fault so that data written as a logical one (or in another case, a logical zero) reads correctly, but data written as a logical zero (or in the other case, a logical one) reads incorrectly. While some embodiments of the invention will use the aforementioned unidirectional error phenomenon, especially to speed up convergence, other embodiments may not make use of or even assume the phenomenon.

Embodiments of the invention use unsatisfied parity checks to locate potential errors caused by bit-line defects across multiple pages in a block, advantageously use the same parity checks as used by an error correction encoding, such as with low density parity check codes, may be computed using the decoder of a controller or computed using dedicated hardware and/or software. While the term "parity check" is used herein, such parity checks may be binary or nonbinary, depending on the nature of the error correction encoding. In general, numerical studies show a strong linear relationship between raw errors and the number unsatisfied parity checks at zero iterations of an iterative decoding procedure (e.g., an initial and/or partial iteration through the decoder is not counted as an iteration). At the zeroth iteration, a syndrome is calculated and the bitmap of the number of unsatisfied parity checks at each bit location is generated, or a processed version thereof. Each wrong bit at the zeroth iteration is connected to at least one unsatisfied parity check, while if enough iterations are run the decoder can end in a state where some error bits, usually a small number and less than the minimum distance of the code, would not be connected to any unsatisfied parity check. Generally, at the initial stage of the iterative decoding, for a column weight Q code at error location I, a single raw bit error causes Q unsatisfied parity checks at the location I. If the number of counters to maintain is not a concern, counters are maintained for each respective bit-line in the block, or group of blocks (or dies). A counter is incremented through a method described herein each time the corresponding bit location is positively identified to be part of a bit-line defect. Alternatively, a new counter is allocated each time a bit is declared to be part of a bit-line defect for the first time.

While the examples herein use bit-lines in a nonvolatile memory array, the techniques described are applicable to any data storage organization in which physical defects in the storage medium are able to be correlated across multiple, separately-stored codewords with positions in the codewords. For example, an areal (e.g., circular) or linear (e.g., scratch) defect in a hard-disk drive is correlated with errors in certain codeword positions across multiple tracks. The correlated positions in the codewords may vary depending on the track, but it is known a priori that a physical defect in a certain position in a codeword in track X may imply a related physical defect in a corresponding position in a codeword in track X+1. In the case of bit-line defects, the corresponding positions are generally a same position.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 94 and 100 form a drive (or device) 102. The circuits 92 to 102 may represent modules and/or blocks that may be implemented as hardware, software, a combination of hardware and software, or other implementations.

One or more signals (e.g., HOSTIO) are exchanged between the circuit 92 and the circuit 100. The host input/output signal HOSTIO generally includes, but is not limited to, a logical address component used to access data in the circuit 102, a host command component that controls the circuit 102, a write data component that transfers write data from the circuit 92 to the circuit 100 and a read data component that transfers error corrected read data from the circuit 100 to the circuit 92. One or more signals (e.g., NVMIO) are exchanged between the circuit 100 and the circuit 94. The nonvolatile memory input/output signal NVMIO generally includes, but is not limited to, a physical address component used to access data in the circuit 94, a memory command component that controls the circuit 94 (e.g., read or write commands), a write codeword component that carries error correction coded and/or cyclical redundancy check protected write codewords written from the circuit 100 into the circuit 94 and a read codeword component that carries the error correction coded and/or cyclical redundancy check protected data read from the circuit 94 to the circuit 100.

The circuit 92 is shown implemented as a host circuit. The circuit 92 is generally operational to read and write data to and from the circuit 94 via the circuit 100. In some embodiments and/or usage scenarios, when reading or writing, the circuit 92 transfers a logical address value in the signal HOSTIO to identify which set of data is to be written or to be read from the circuit 94. The address generally spans a logical address range of the circuit 102. The logical address can address individual data units, such as SATA (e.g., serial-ATA) sectors.

The circuit 94 is shown implementing one or more nonvolatile memory circuits (or devices). According to various embodiments, the circuit 94 comprises one or more nonvolatile semiconductor devices, such as NAND flash devices. In other embodiments, the circuit 94 comprises any one or more nonvolatile storage media, including a hard-disk drive (e.g., HDD). The circuit 94 is generally operational to store data in a nonvolatile condition. When data is read from the circuit 94, the circuit 94 accesses a set of data (e.g., multiple bits) identified by the address (e.g., a physical address) in the signal NVMIO. The address generally spans a physical address range of the circuit 94.

The circuit 100 is shown implementing a controller circuit. The circuit 100 is generally operational to control reading to and writing from the circuit 94. The circuit 100 includes an ability to decode the read data received from the circuit 94. The resulting decoded data is presented to the circuit 92 via the signal HOSTIO and/or re-encoded and written back into the circuit 94 via the signal NVMIO. The circuit 100 comprises one or more integrated circuits (or chips or die) implementing the controller of one or more solid-state drives (e.g., SSD), hard-disk drive, embedded storage, or other suitable control applications.

As part of the decoding, the circuit 100 generates a syndrome (each position in the syndrome corresponding to multiple parity checks) by performing a syndrome computation process on the read data. In some embodiments, the syndrome computation process is a portion less than all of an iterative decoding procedure. In other embodiments, the syndrome computation process evaluates the read data using an H matrix of the error correction code to determine which parity check equations are satisfied and which are not. The circuit 100 also generates a count value by counting a number of unsatisfied parity checks for each position in the syndrome and/or by counting a total number of positions in the syndrome that have unsatisfied parity checks. The unsatisfied parity checks can be determined by a number of ways, such as with just $(M-1)/M$ of an iteration of a layered decoder, where M is the number of layers in the parity direction of the layered decoder.

The circuit 102 is shown implementing a solid-state drive. The circuit 102 is generally operational to store data generated by the circuit 92 and return the data to the circuit 92. According to various embodiments, the circuit 102 comprises one or more: nonvolatile semiconductor devices, such as NAND Flash devices, phase change memory (e.g., PCM) devices, or resistive RAM (e.g., ReRAM) devices; portions of a solid-state drive having one or more nonvolatile devices; and any other volatile or nonvolatile storage media. The circuit 102 is generally operational to store data in a nonvolatile condition. For example, in some embodiments, the circuit 102 is a hard-disk drive.

Figure 2:
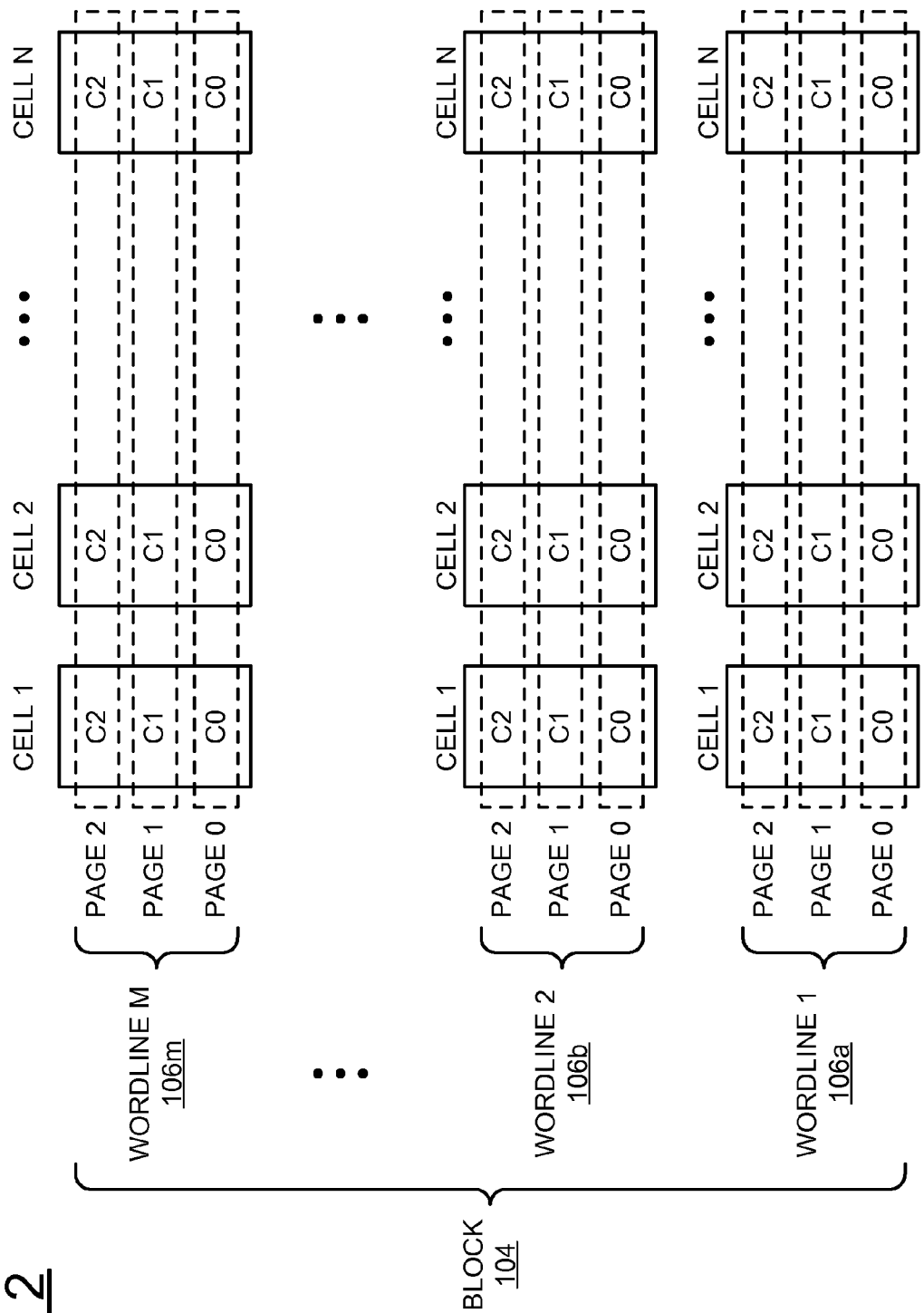
FIG. 2 is a block diagram of a flash block.

Referring to FIG. 2, a block diagram of an example flash block 104 is shown. The block 104 is generally organized as multiple wordlines 106a-106m. Each wordline 106a-106m includes multiple cells 1-N. Each cell has multiple (e.g., 3) pages 0-2, a page for each bit of the multi-bit cells (e.g., 3 bits $C_0$-$C_2$). Accessing a given wordline 1-M results in accessing each cell 1-N on the given wordline in parallel. Reading a given page 0-2 in the given wordline involves one or more reads at different reference voltages to sense the various charges stored by each cell 1-N.

Figure 3:
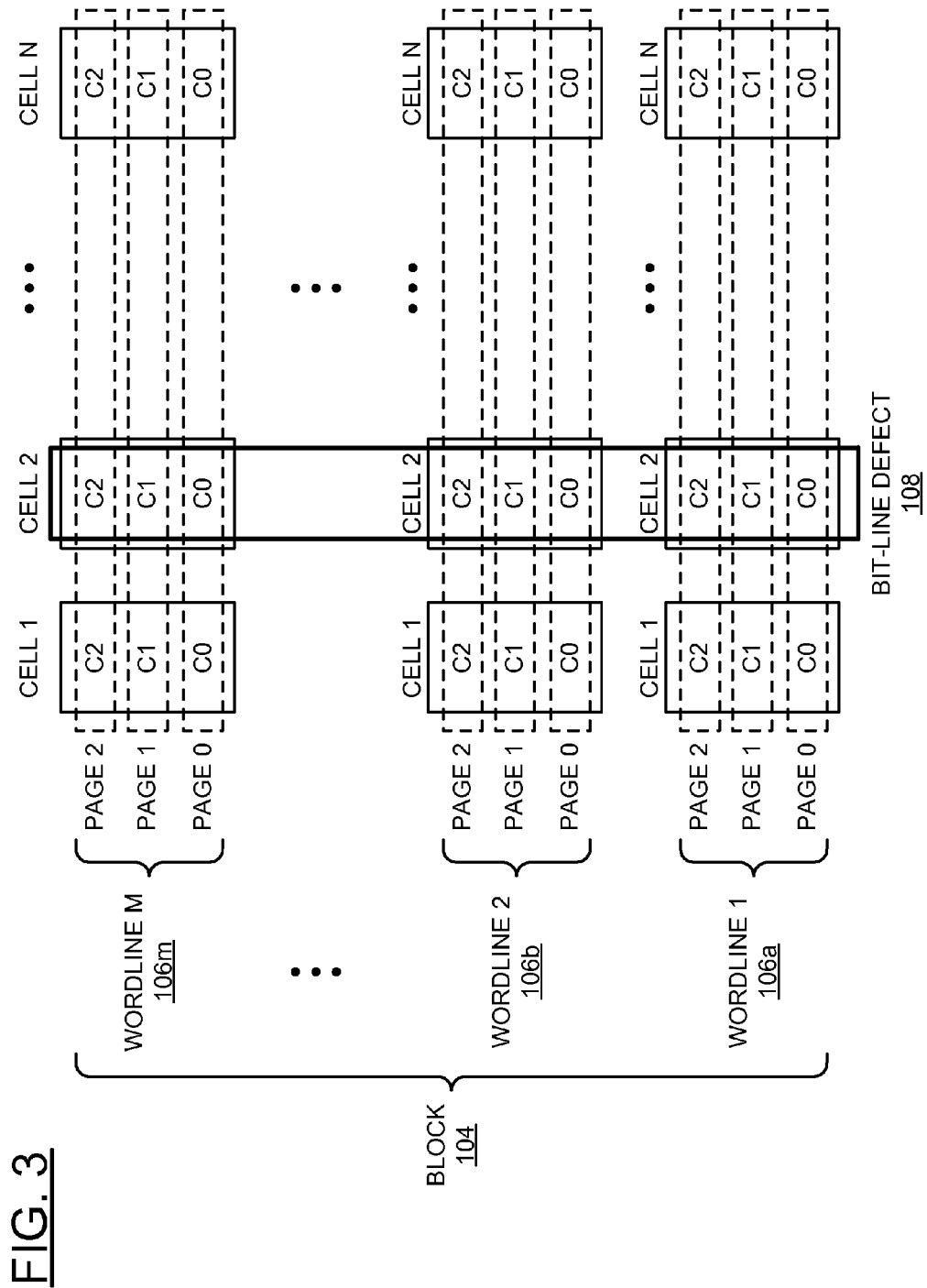
FIG. 3 is a block diagram of the flash block with a bit-line defect.

Referring to FIG. 3, a block diagram of the flash block 104 with an example bit-line defect 108 is shown. The bit-line defect 108 causes all reads of cell 2 on all pages 0-2 of all wordlines 1-M in the block 104 to return a certain value (e.g., either a logical one or a logical zero). The returned value depends on the nature of the defect. Although a single bit-line defect 108 is shown, the block 104 can have other numbers of defective bit-lines at different times and aligned with one or more of the cells 1-N.

Figure 4:
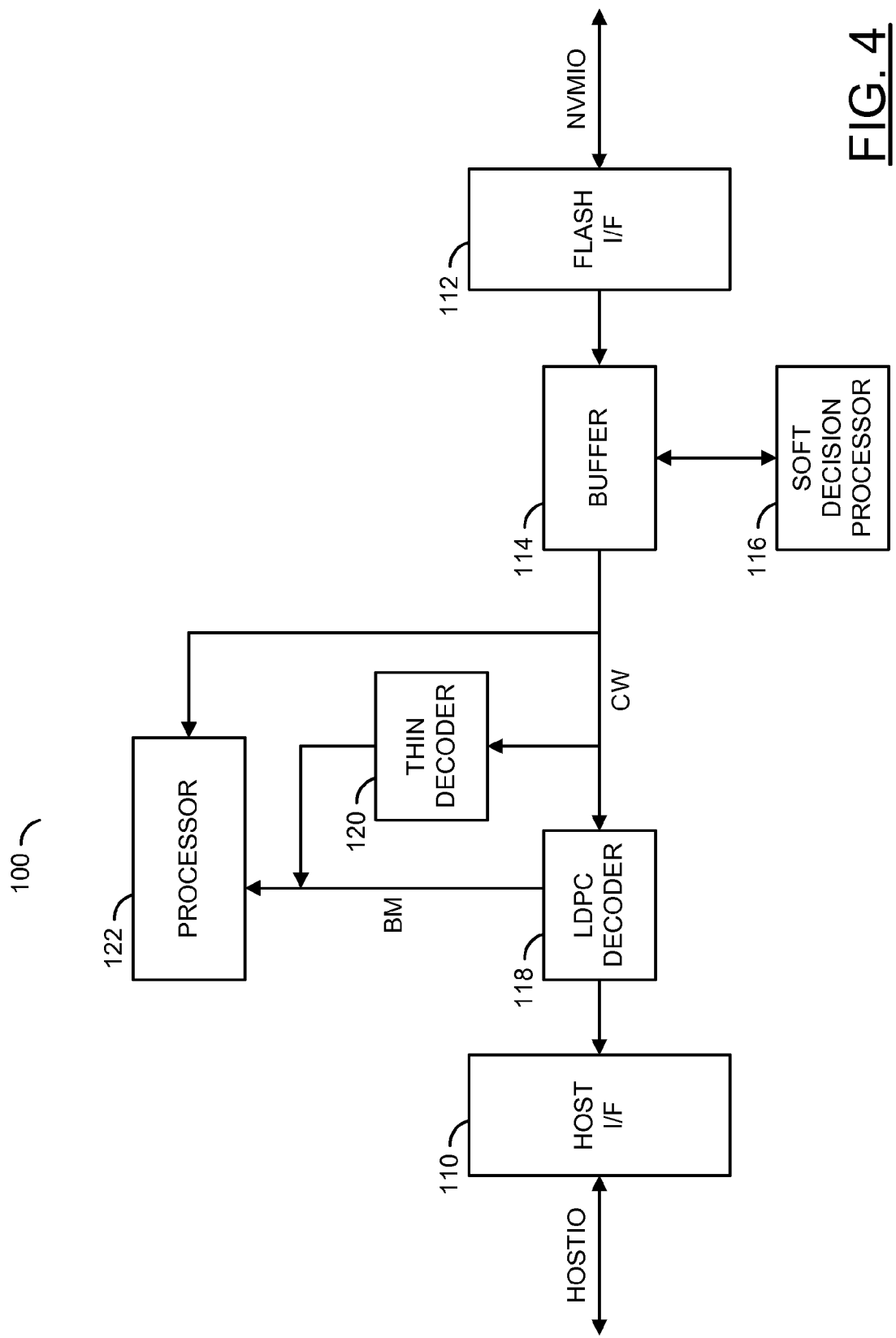
FIG. 4 is a block diagram of a controller circuit in accordance with an embodiment of the invention.

Referring to FIG. 4, a block diagram of an example implementation of the circuit 100 is shown in accordance with an embodiment of the invention. The circuit 100 generally comprises a block (or circuit) 110, a block (or circuit) 112, a block (or circuit) 114, a block (or circuit) 116, a block (or circuit) 118, an optional block (or circuit) 120 and a block (or circuit) 122. The circuits 110 to 122 may represent modules and/or blocks that may be implemented as hardware, software, a combination of hardware and software, or other implementations.

A signal (e.g., CW) is shown being generated by the circuit 114 and presented to the circuits 118, 120 (optionally) and 122 (optionally). The signal CW carries the data read from the circuit 112 and decoding parameters stored in the circuit 114. A signal (e.g., BM) is shown being generated by the circuit 118 or 120 and received by the circuit 122. In some embodiments, the signal BM generally conveys the bitmap used to detect bit-line defects. In other embodiments, the signal BM generally conveys a bitmap of the unsatisfied parity check count at each bit location. In still other embodiments, the signal BM conveys a compressed version of the bitmap, where a threshold is applied to translate the nonbinary bitmap from a higher degree to a lower degree nonbinary field, or all the way down to a binary bitmap. The circuit 122 uses the bitmap along with other state information to detect the bit-line defects.

The circuit 110 is shown implemented as a host interface circuit. The circuit 110 is operational to provide communication with the circuit 92 via the signal HOSTIO. Other signals may be implemented between the circuits 92 and 110 to meet the criteria of a particular application.

The circuit 112 is shown implemented as a nonvolatile memory (e.g., flash) interface circuit. The circuit 112 is operational to provide communication with the circuit 94 via the signal NVMIO. Other signals may be implemented between the circuits 94 and 110 to meet the criteria of a particular application.

The circuit 114 is shown implemented as a buffer circuit. The circuit 114 is operational to buffer data received from the circuit 94 via the circuit 112. The circuit 114 is also operational to buffer decoding parameters generated by the circuit 116 and/or by the circuit 122 (link not illustrated). The read data and the decoding parameters are presented from the circuit 114 to the circuits 118, 120 (optionally) and 122 (optionally).

The circuit 116 is shown implemented as a soft-decision processor circuit. The circuit 116 is operational to generate decoding parameters (e.g., log likelihood ratio (LLR) values) used in a soft-decision decoding performed by the circuit 118. The decoding parameters are presented by the circuit 116 to the circuit 114 for storage, or in other embodiments to circuit 118. According to various embodiments, the circuit 116 may be implemented as one or more of: a dedicated hardware unit that processes raw soft bits read from circuit 94; as a processor core (e.g., an ARM core); as a custom designed circuit; as software executing on the circuit 122; and any combination of the foregoing.

The circuit 118 is shown implemented as a soft-decision decoder circuit. In some embodiments, the circuit 118 is implemented as one or more low density parity check decoder circuits. The circuit 118 is operational to perform both hard-decision (e.g., HD) decoding and/or soft-decision (e.g., SD) decoding of the codewords received from the circuit 114. The soft-decision decoding generally utilizes the decoding parameters created by the circuit 116 and/or the circuit 122. In various embodiments, the circuit 118 also generates and presents the bitmap in the signal BM. The bitmap is usually updated periodically (or infrequently) based on a predetermined schedule. In some embodiments, the signal BM provides information on unsatisfied parity check counts in each of selected operations of circuit 118 as a vector of nonbinary values, and in other embodiments a binary version is generated by circuit 118 of the same bitmap information.

The circuit 120 is shown implemented as an optional thin decoder circuit. The circuit 120 is a simplified (or thinned) version of the low density parity check decoder (e.g., circuit 118) and is used to generate the signal BM separately from decoding the user data received in the codewords. Calculating at least some of the unsatisfied parity checks to detect defective bit-lines is done using the circuit 120, while user data is still decoded with the circuit 118. The circuit 120 generally implements a simple combinatorial circuit (more area, less delay) or a shift register circuit (less area, more delay) to compute only a portion of the parity checks. The parity checks are calculated in a manner that is sufficient to generate the signal BM with enough granularity such that the defect detection scheme will converge after enough pages are read.

The circuit 122 is shown implemented as a processor circuit. The circuit 122 is operational to command and/or assist with the multiple read/write requests and to control one or more reference voltages used in the circuit 94 to read the data. The circuit 122 is also operational to process the signal BM to determine when a bit-line/bit-lines in the circuit 94 has/have become defective. In some embodiments, the circuit 122 is operational to adjust future writes to the circuit 94 to avoid the detected faulty bit-lines. In some embodiments, the circuit 122 can present the detected faulty bit-line information to the circuit 116. The circuit 116 subsequently uses the information to adjust the log likelihood ratio values (e.g., set to zero) for bits in the codewords known to correspond to defective bit-lines. In various embodiments, the circuit 122 retires blocks in which too many defective bit-lines are detected. The retirement usually occurs before the block becomes unreadable. Thus, data in a defective block can be read, error corrected and stored elsewhere.

In various embodiments, the bitmap is generated by the circuit 122 from the codewords. The circuit 122 can receive the data from the circuit 114 in the signal CW. Firmware/software running in the circuit 122 calculates a selected portion of the parity checks, similar to the circuit 120. A size and a coverage of the portion should be sufficient to converge after a few pages have been read.

Figure 5:
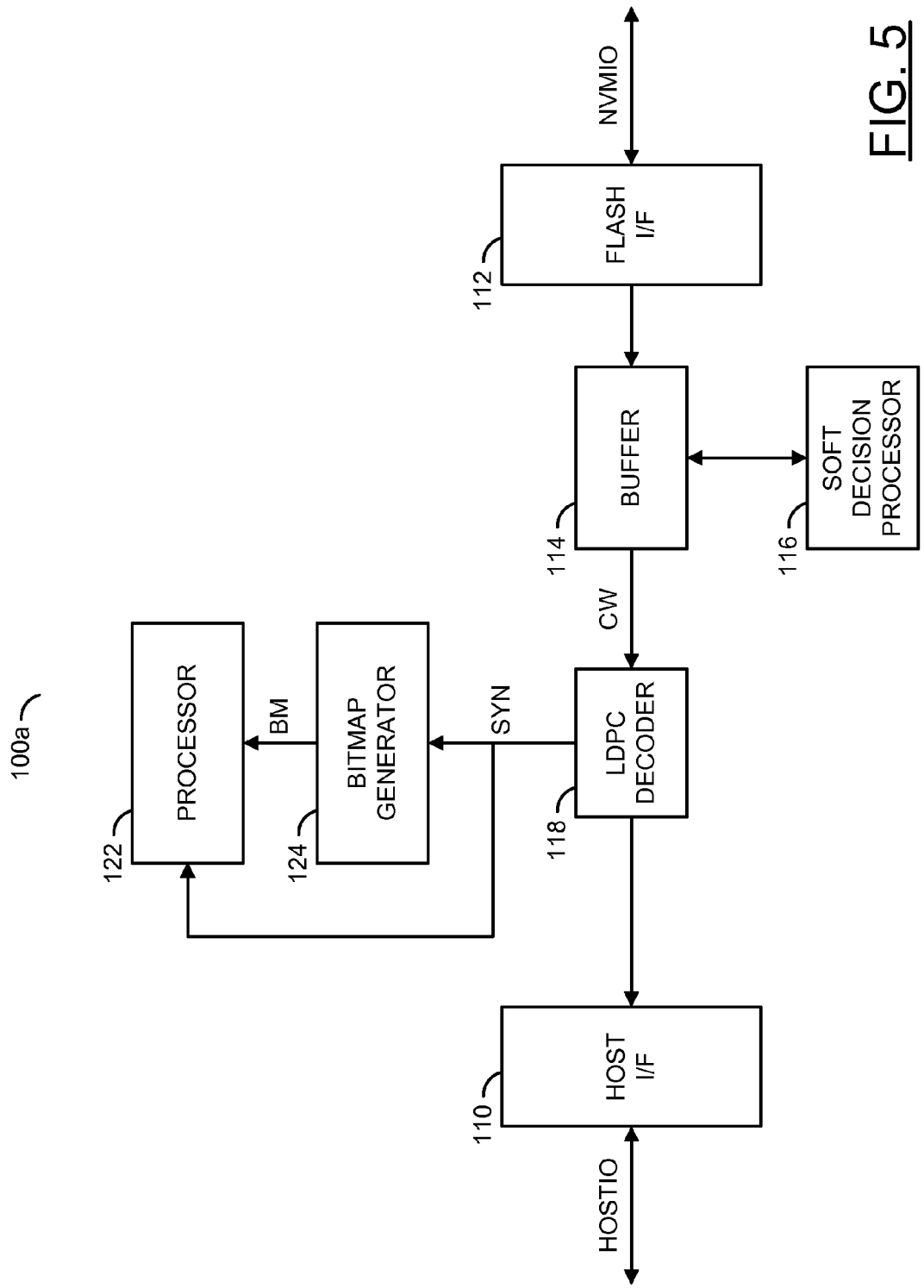
FIG. 5 is a block diagram of another controller circuit.

Referring to FIG. 5, a block diagram of an example implementation of a circuit 100a is shown. The circuit 100a may be a variation of the circuit 100. The circuit 100a generally comprises the circuit 110, the circuit 112, the circuit 114, the circuit 116, the circuit 118, the circuit 122 and an optional block (or circuit) 124. The circuits 110 to 124 may represent modules and/or blocks that may be implemented as hardware, software, a combination of hardware and software, or other implementations.

A signal (e.g., SYN) is shown being generated by the circuit 118 and transferred to the circuits 122 and 124. The signal SYN generally conveys the syndromes calculated by the circuit 118 during decoding operations. In some embodiments, the syndrome is a vector of binary/nonbinary flags that corresponds to the check equations of the low density parity check decoder, in which a non-zero value results from each unsatisfied check. The signal. BM is shown being generated by the circuit 124 and received by the circuit 122.

The circuit 124 is shown implementing an optional bitmap generator circuit. The circuit 124 is generally operational to generate the bitmap using the syndrome calculated by the circuit 118. In various embodiments, the circuit 124 is implemented as dedicated hardware or a processor executing dedicated firmware/software. The circuit 124 uses the syndrome received in the signal SYN and a copy of the H parity matrix to compute the number of unsatisfied parity checks per bit location. Alternatively, bits connected to at least unsatisfied parity checks are mapped to logical one in the bitmap, and bits connected to W=0 unsatisfied parity checks are mapped to logical zero. The value W may be uniform across all bits and is less or equal to an average/maximum column weight of the code, or else, is nonuniform across all bits and is less than or equal to the individual per-bit column weights, in general, for irregular low density parity check codes. The accuracy of the bitmap-based method is code-dependent. For example, a lower code rate means less bit density per checks (given a fixed column weight across all code rates), hence, a smaller Hamming weight bitmap, which means less false identification. A lower code rate also furnishes a wider range of linearity for different channel bit error rate severities.

In some embodiments, the bitmap is generated by the circuit 122 from the syndromes. The circuit 122 can receive the syndromes from the circuit 118 in the signal SYN. Firmware and/or software running in the circuit 122 calculates the bitmap, similarly to the circuit 124. The defective bit-lines are subsequently identified from the information in the bitmap.

Using more of the low density parity check decoding capability of the circuit 118 provides several options. The circuit 118 can compute the bitmap and/or a partial syndrome at any point in the decoding process, a priori, or after one or several layers, or after the zeroth, first, or multiple full iterations. The circuit 118 can also be run for additional iterations to reduce the non-zero entries of the bitmap/syndrome. As such, the additional iterations act as a filter for errors that can be easily corrected. In contrast, the defective bit-line caused errors can be harder to correct. If the soft low density parity check decoding is run using log likelihood ratio values coming from the circuit 116 and the decoder is not converging, the remaining errors are likely due to errors coming from bit-line defects that appear as high reliability (e.g., large floating point log likelihood ratio values or saturated fixed-point log likelihood ratio values) as generated by the circuit 116.

In various embodiments where only hard decoding is performed or if the full decoding is not performed, an implementation where the zeroth iterations are run in the full low density parity check decoder (e.g., circuit 118) may be implemented. In such a case, the bit-line defect caused errors are not distinguishable according to the log likelihood ratio magnitudes and, hence, may be corrected early and not detected when running more iterations. Thus, detecting the bit-line defects from the zeroth iteration avoids having the faults hidden in the hard decoding mode of the circuit 118.

Another scenario exists where a raw bit error rate is low enough that circuit 118 would correct many errors if run more than a single iteration. Therefore, the detection coverage would be smaller. As such, detecting the bit-line defects from the zeroth iteration avoids having the faults hidden.

Figure 6:
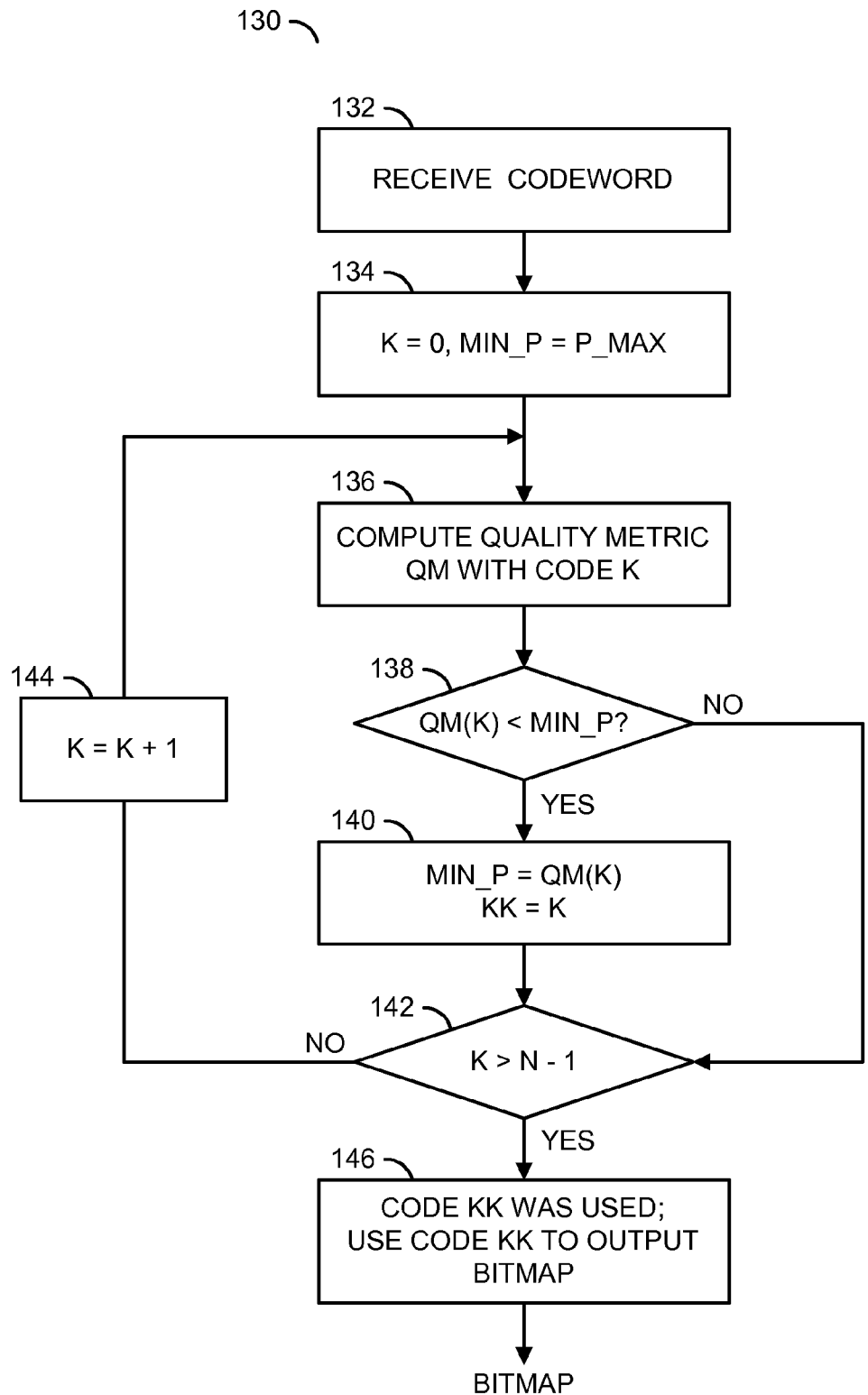
FIG. 6 is a flow diagram of a method for generating a bitmap.

Referring to FIG. 6, a flow diagram of an example implementation of a method 130 for generating the bitmap is shown. The method (or process) 130 is implemented in the circuit 100 and/or the circuit 102. The method 130 generally comprises a step (or state) 132, a step (or state) 134, a step (or state) 136, a step (or state) 138, a step (or state) 140, a step (or state) 142, a step (or state) 144, and a step (or state) 146. The steps 132 to 146 may represent modules and/or blocks that may be implemented as hardware, software, a combination of hardware and software, or other implementations.

In the step 132, the circuit 100 receives the read data from the circuit 94. A code rate K is initialized to an initial rate (e.g., code rate 0), and a current smallest quality metric value (e.g., MIN_P) among N available code rates (e.g., K=0 to K=N−1) is initialized to a maximum possible quality metric value (e.g., P_MAX) in the step 134. The value of P_MAX corresponds to the largest number of checks among the N codes. In the step 136, a quality metric value (e.g., QM(K)) for the data as decoded using the code rate K is calculated.

A check is performed in the step 138 to determine if the just-calculated quality metric value QM(K) is better (e.g., having a lower value) than the current smallest quality metric value MIN_P. If the just-calculated quality metric value QM(K) is better, the circuit 100 sets the current smallest quality metric value MIN_P to the just-calculated quality metric value QM(K) and sets a current code rate (e.g., KK) to the current code rate K in the step 140. Once the current values have been updated, or if the just-calculated quality metric QM(K) is larger than the current smallest quality metric value MIN_P, the method continues with the step 142.

In the step 142, a check is made to see if any more code rates K remain to be checked. If code rates remain unchecked, the circuit 100 increments the current code rate K in the step 144 and returns to the step 136. Once all of the code rates have been checked, the circuit 100 generates the bitmap in the step 146 using the current code rate KK. The bitmap is presented from the step 146.

Another side product is the quality metric QM(K), which can be used to calculate the bit error rate at which the memory device is operating, as is demonstrated in co-pending U.S. provisional application Ser. No. 61/901,064, filed Nov. 7, 2013. An almost linear relationship exists between the quality metrics and the raw bit error rate, especially at very low bit error rates when not many decoder iterations are run. The linear relationship can be used to optionally calculate the raw bit error rate from the number of unsatisfied checks in the step 146. In some embodiments, a square-law, cubic-law, or higher order polynomial-law type fit for the relationship may be used for high accuracy, especially at high bit error rates to capture any non-linearity in the relationship. Other curve fitting routines may be implemented to meet the criteria of a particular application.

Figure 7:
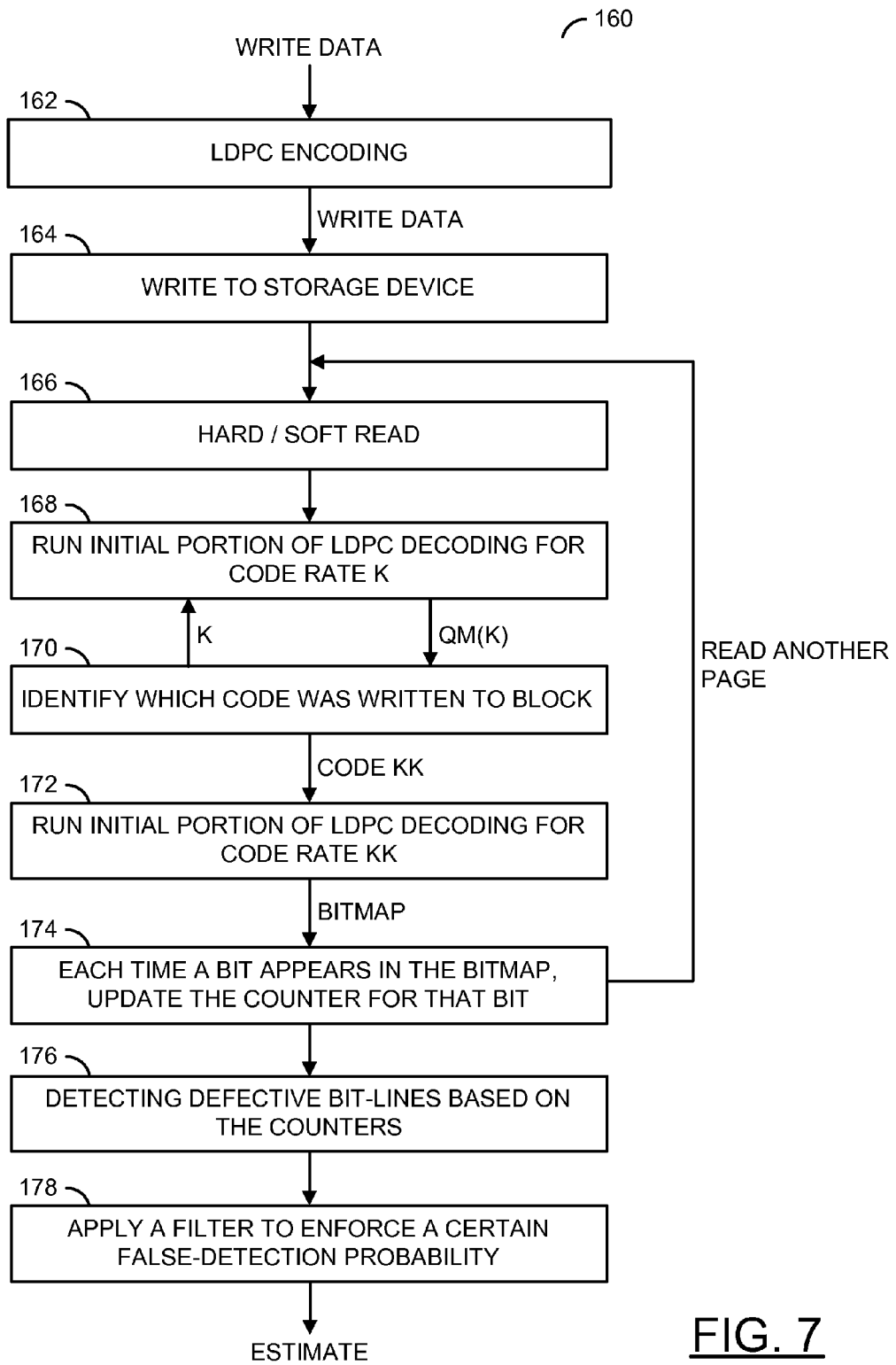
FIG. 7 is a flow diagram of a method for identifying bit-line defects.

Referring to FIG. 7, a flow diagram of an example implementation of a method 160 for identifying bit-line defects is shown. The method (or process) 160 is implemented in the circuit 100, the circuit 96 and/or the circuit 102. The method 160 generally comprises a step (or state) 162, a step (or state) 164, a step (or state) 166, a step (or state) 168, a step (or state) 170, a step (or state) 172, a step (or state) 174, a step (or state) 176 and a step (or state) 178. The steps 162 to 178 may represent modules and/or blocks that may be implemented as hardware, software, a combination of hardware and software, or other implementations.

Write data may be received by the circuit 100 from the circuit 92. The circuit 100 encodes the write data at a given code rate using an encoding process (e.g., a low density parity check code process at a code rate 0) in the step 162. The encoded write data, sometimes referred to as a codeword, is written into the circuit 94 by the circuit 100 in the step 164.

In the step 166, the circuit 100 reads the previously written codeword using a hard (e.g., binary) read technique. The same outcome of step 166 can be reached if multiple hard reads, or a direct soft read occurs as the desired hard read is a subset of the multiple reads or is a hard sliced version of the direct soft read. The circuit 100 generates the quality metric QM(K) by running an initial portion of a decoding process (e.g., the low density parity check code process) in the step 168 at a current code rate K. The quality metric QM(K) is generally the number of unsatisfied parity checks divided by the codeword length when using the parity check matrix of code K.

In the step 170, the circuit 100 may initiate a repeat of the decoding process using a different code rate K if, for example, the code rate is not known a priori. Returning to the step 168, the circuit 100 runs the initial portion of the decoding process on the read data using the parity check matrix of a different code. A loop between the steps 168 and 170 is repeated until all of the possible code rates have been checked. An estimation of the code rate KK used to encode the codeword is generated in the step 170 by identifying the code rate corresponding to a lowest quality metric value. In embodiments where the circuit 94 uses a single code rate K, the steps 168 and 170 are skipped and the code rate KK is set to the single code rate K.

In the step 172, the circuit 100 runs an initial portion of the decoding (e.g., the low density parity check decoding) for the identified code rate KK. When unsatisfied parity checks are found, the circuit 100 sets the corresponding positions in the bitmap to the number of unsatisfied parity checks in the step 174. On the other hand each position in the bitmap that corresponds to all satisfied parity checks is set to a logical zero value. In some embodiments, each such nonbinary count value is saturated for each bit to a threshold of at least $T \leq Q$ unsatisfied parity checks, where Q is the maximum/average column weight and T is a programmable threshold. A counter is maintained for each bit-line in the block, or group of blocks (or dies). In various embodiments, individual counters are allocated each time an asserted bit appears in the bitmap. The counter for a bit-line is updated (e.g., incremented/decremented) each time an asserted bit from that bit-line appears in the bitmap. The method 160 generally returns to the step 166 to read another page from the circuit 94.

Per a specified schedule, the circuit 100 generates a list in the step 176 of defective bit-lines that have been detected. The detection is based on the values of the counters. In some embodiments, multiple bit-lines with the largest running counters are selected as possible detections of faulty bit-lines. Other techniques for discriminating between possible faulty bit-lines and operational bit-lines may be implemented to meet the criteria of a particular implementation.

Generally, various embodiments utilize two characteristics of the bit-line defects, read/write errors and value persistency. Attempts are made to measure the likelihood that a bit-line is defective by tracking bit-lines with the worst combined metric of being in error or stuck at a certain value for varying, and possibly non-continuous, periods of time. The method by which the combined metric is computed varies among different embodiments and may be independent of partially decoded read data. The combined metric is at least based on the ability to recognize that a portion of bits in a bit-line are not in the intended state or assume a certain state more often than is suggested by the statistical properties of the data to be written.

In the step 178, the counter values of the possibly defective bit-lines are filtered to lower the detection rate to an acceptable false detection rate (or probability). In some embodiments, a threshold is set where all counter values are suppressed if all counter values are below the threshold. Furthermore, at least a predetermined number of pages should be read to avoid premature identification of defective bit-lines. In some embodiments, each counter value above a floor threshold is declared as evidence of a corresponding defect bit-line.

Several modes of operation are available since the raw bit error rate can be estimated blindly by the method 130. If the raw bit error rate is low and few decoding iterations are run (e.g., in a range where performance of a low density parity check code is in an error floor region where low density parity check failures are a weak function of bit error rate, rather than a waterfall region where the low density parity check failure rate can change several decade orders if the underlying bit error rate changes by much less than a decade), the circuit 100 can be very discriminating in updating the counters. In such a case, the counters are updated only for potentially wrong bits connected to T=Q unsatisfied parity checks (per bit column weight=Q). However, if many decoding iterations are run, the counters are updated for bits connected to as low as T=2 unsatisfied parity checks as errors can group into small error structures called trapping sets. In the trapping sets, checks can be satisfied because the checks share an even number of error bits in even parity codes, and so there are less unsatisfied checks per error location.

If the raw bit error rate is high (e.g., in a range where performance of the low density parity check code is in the waterfall region), the circuit 100 can update the counter in even further scenarios irrespective of how many iterations are run provided enough pages are read to eliminate candidate locations that are not persistently in error or at a certain semi or omni-persistent state. For example, in such a case, the corresponding counter values are incremented by Q for candidate wrong bits connected to at least Q unsatisfied parity checks, incremented by Q–1 for bits connected to Q–1 unsatisfied checks, and so on. On the other hand, if many decoding iterations are run to generate the bitmap, the update rules can follow nonlinear formulas to account for the nonlinear relationship of the number of unsatisfied checks and error likelihood caused by the decoder getting stuck in trapping sets.

In some embodiments, and according to the error rate, the counter in a given position is selectively incremented or decremented depending on a respective value of a number of unsatisfied parity checks in the given position. In an example, with a low error rate, the counter is incremented if the number of unsatisfied parity checks is Q, and is otherwise decremented. In another example, with a high error rate, the counter is incremented by Q if the number of unsatisfied parity checks is greater than or equal to Q–1, and is otherwise decremented by 1.

According to various embodiments, the counters saturate at maximum and/or minimum values. For example, with an N-bit counter, incrementing one of the counters past $2^N-1$ results in the value of the counter saturating at $2^N-1$, and similarly decrementing the counter to be less than zero results in the value of the counter saturating at zero. In other embodiments, a range of the counters is biased and the minimum value of the counters is a negative number.

According to various embodiments, a function used to update the counters based on the respective numbers of unsatisfied parity checks, the threshold values used to filter the counters, and/or the number of bit error rate modes, can be adjusted to achieve a tradeoff of complexity and detection accuracy. A combination of the function, the threshold values, and the bit error rate modes can improve an overall detection accuracy, improve a false detection rate, and reduce a size of state information to save.

The less-discriminating modes of operation generally result in more correct (or error free) bit-lines appearing in the potential list of bit defects. However, with enough pages read the detection technique converges to the true defect bit-lines and the non-defective bit-lines are eliminated from the potential list.

Faster convergence can also be achieved by saving cell state history. Defective bit-lines are sometimes characterized by cells stuck at a certain state that resists programming and erasing. Such cell state information (e.g., stuck at logical zero or logical one) can be used to increase the convergence speed of the detection technique. For example, a vector is maintained by the circuits 118, 120, and/or 122 according to a respective last observed value in each bit position and/or a respective indication of whether each position had unsatisfied checks with the value. The increment of the counter is according to a current value in each bit position, the respective last observed value/values, and/or the respective indication.

A number of "only" conditions can be considered alone and/or in combination. In various embodiments, only count if the bit is in a certain state (e.g., the preferred error state, either logical zero or logical one). The circuit 100 counts up for the preferred error state (e.g., zero/one) and down for a good state (e.g., one/zero). In some embodiments, the circuit 100 remembers the value of the last (or previous) state of the stuck bit that failed to satisfy one or more or at least a threshold number of parity checks, and only counts if the same value is found at a current time. In some embodiments, the value of the last (or previous) state of the stuck bit is remembered. However, the circuit only counts if the same value is found at the current time, but zeros (e.g., resets) the counter if the value of the bit is different. An advantage of zeroing the counters may be that the system can maintain smaller, saturating counters, and, in some implementations, just a few bits (plus the state bit) for some cases. In other embodiments, a counter is selectively incremented or decremented according to the previous state matching the current state, and the magnitude of the increment and/or decrement is according to a current value of the counter and/or the number of unsatisfied parity checks.

In general terms, a result of a portion less than all of an iterative decoding procedure is a vector (e.g., UCC[ ]) indicating a number of unsatisfied parity checks in each position of a codeword. In various embodiments, each element of the vector UCC[ ] has fewer bits than are able to store a largest possible number of unsatisfied parity checks, and an element of the vector UCC[ ] saturates at a maximum value if the number of unsatisfied parity checks in a respective position of the element exceeds the maximum value. In some embodiments and/or usage scenarios, the vector UCC[ ] is a binary vector with a logical zero indicating less than a threshold number of unsatisfied parity checks in the corresponding position, and a logical one indicating greater than or equal to the threshold number of unsatisfied parity checks in the corresponding position. In further embodiments, the threshold number of unsatisfied parity checks is zero.

An optional vector (e.g., VAL_HIST[ ]) tracks a history of values seen in each position of the codeword. The vector VAL_HIST[ ] includes information for each position of the codeword indicating one or more of: a previous value; a count of a number of times a previous value was observed; a count of a number of times a previous value was observed in a row; a delta between a number of times a previous value was observed to be a zero versus a one; and an indication of whether each of one or more previous values had unsatisfied parity checks.

A vector (e.g., AUCC[ ]) accumulates counts from multiple vectors UCC[ ] from respective portions less than all of an iterative decoding procedure performed on respective codewords. The vector AUCC[ ] is accumulated according to an update equation such as: AUCC[ ]=f(AUCC[ ], UCC[ ], VAL_HIST[ ]), or AUCC[ ]=f(AUCC[ ], UCC[ ]) if VAL_HIST[ ] is not used. In an example, the function f is a simple increment. In another example, the function f is a selective increment or decrement based on the corresponding value of the vector UCC[ ] and the column weight Q.

A list of defective lines is generated from the vector AUCC by a function such as: bitmap[ ]=g(AUCC[ ]). For example, the function g can be a threshold operation returning a logical one if the corresponding position is greater than or equal to a threshold value.

The defective bit-line detection is not restricted by decoder convergence. The detection can run at any raw bit error rate irrespective of how much retention the data has undergone, or how much read disturb cycles the block has accumulated. At an end of life, flash memories have an increased frequency of bad blocks and bit-line defects that make decoding difficult. Even at the beginning of life, data retention can affect decoder convergence, especially for low-end applications where bit-line defects can be more frequent. A sufficiently large number of undetected bit-line defects can cause the decoding to fail all the time even if the raw bit error rate is low because the coding may be sensitive to write errors caused by the bit-line defects.

The detection technique generally has a granularity of at most Q unsatisfied parity checks per wrong bit for column weight Q code at a certain bit location. The bitmap can be found with just (M−1)/M of an iteration time, where M is the number of layers in the parity direction of the layered decoder, so the bitmap is computed by less than a single iteration time. The more pages that are read, the higher the accuracy and the lower the false identification rate. Actual bit-line defects are always present in the running list of potential bit-line defects where the unsatisfied parity checks are considered at the zeroth iteration. The detection succeeds where the decoder fails to converge to correct to the written codeword. The detection can operate in different bit error rate regions of the flash memory by changing the threshold to generate the bitmap. The detection can also blindly detect in which bit error rate region the flash memory is operating at and which code rate the block was written in adaptive rate systems. The history of cell state information can be used on-the-fly to speed up convergence when such information is available.

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to process a plurality of read/write operations to/from a memory, wherein a plurality of bit-lines in the memory are used to access each of at least two codewords; and
   a control circuit configured to (i) generate a syndrome during a decode of a first of the at least two codewords, (ii) update a map of defects in the memory according to the syndrome, wherein each of a plurality of bits in the map of defects corresponds to a respective one of the plurality of bit-lines in the memory, and (iii) decode a second of the at least two codewords in response to the map of defects.

2. The apparatus according to claim 1, wherein the control circuit is further configured to update a respective count value of each of the plurality of bits in the map of defects according to a respective number of unsatisfied parity checks derived from the syndrome.

3. The apparatus according to claim 2, wherein the circuit is further configured to detect defective ones of the plurality of bit-lines based on one or more of (i) the respective count values and (ii) a history of states of the plurality of bit-lines.

4. The apparatus according to claim 2, wherein the control circuit is further configured to reduce a false detection rate by filtering the respective count values.

5. The apparatus according to claim 1, wherein the map of defects is generated where decoding of a previous codeword fails to converge.

6. The apparatus according to claim 1, wherein the memory is nonvolatile.

7. The apparatus according to claim 1, wherein the at least two codewords are decoded by a low density parity check decode.

8. The apparatus according to claim 1, wherein the control circuit is further configured to (i) utilize each of a plurality of code rates in the decode of the first codeword, (ii) identify a given one of the plurality of code rates used to encode the first codeword in the memory and (iii) generate a bit error rate of the memory based on the syndrome.

9. The apparatus according to claim 1, wherein the apparatus is implemented as one or more integrated circuits.

10. The apparatus according to claim 1, wherein the memory and the control circuit are part of a solid-state drive.

11. A method for bit-line defect detection using unsatisfied parity code checks, comprising the steps of:
    receiving at least two codewords at a circuit from a memory, wherein a plurality of bit-lines in the memory are used to access each of the at least two codewords;
    generating a syndrome during a decode of a first of the at least two codewords;
    updating a map of defects in the memory according to the syndrome, wherein each of a plurality of bits in the map of defects corresponds to a respective one of the plurality of bit-lines of the memory; and
    decoding a second of the at least two codewords in response to the map of defects.

12. The method according to claim 11, further comprising the step of:
    updating a respective count value of each of the plurality of bits in the map of defects according to a respective number of unsatisfied parity checks derived from the syndrome.

13. The method according to claim 12, further comprising the step of:
    detecting defective ones of the plurality of bit-lines of the memory based on one or more of (i) the respective count values and (ii) a history of states of the plurality of bit-lines.

14. The method according to claim 12, further comprising the step of:
    reducing a false detection rate by filtering the respective count values.

15. The method according to claim 11, wherein the map of defects is generated where decoding of a previous codeword fails to converge.

16. The method according to claim 11, wherein the memory and the circuit are part of a solid-state drive.

17. The method according to claim 11, wherein the at least two codewords are decoded by a low density parity check decode.

18. The method according to claim 11, further comprising the steps of:

utilizing each of a plurality of code rates in the decode of the first codeword;

identifying a given one of the plurality of code rates used to encode the first codeword in the memory; and generate a bit error rate of the memory based on the syndrome.

19. An apparatus comprising:

a memory configured to store data, wherein a plurality of bit-lines in the memory are used to access each of at least two codewords from among the data; and a controller configured to (i) process a plurality of input/output requests to read/write to/from the memory, (ii) receive the at least two codewords from the memory, (iii) generate a syndrome during a decode of a first of the at least two codewords, (iv) update a map of defects in the memory according to the syndrome, wherein each of a plurality of bits in the map of defects corresponds to a respective one of the plurality of bit-lines in the memory, and (v) decode a second of the at least two codewords in response to the map of defects.

20. The apparatus according to claim 19, wherein the memory and the controller are part of a solid-state drive.

* * * * *